(12) United States Patent
Wege et al.

(10) Patent No.: US 6,803,397 B1
(45) Date of Patent: Oct. 12, 2004

(54) VINYLCYCLOHEXANE—BASED POLYMER/COPOLYMER MIXTURE AND STABILIZER SYSTEM

(75) Inventors: Volker Wege, Neuss (DE); Konstadinos Douzinas, Köln (DE); Friedrich-Karl Bruder, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/913,747

(22) PCT Filed: Feb. 9, 2000

(86) PCT No.: PCT/EP00/01026
§ 371 (c)(1),
(2), (4) Date: Aug. 16, 2001

(87) PCT Pub. No.: WO00/49078
PCT Pub. Date: Aug. 24, 2000

(30) Foreign Application Priority Data

Feb. 19, 1999 (DE) .......................................... 199 06 983

(51) Int. Cl.⁷ ................................................. C08K 5/15
(52) U.S. Cl. ....................................................... 524/111
(58) Field of Search ......................................... 524/111

(56) References Cited

U.S. PATENT DOCUMENTS

| 4,911,966 A | 3/1990 | Murayama et al. ............ 428/64 |
| 6,224,791 B1 * | 5/2001 | Stevenson et al. .......... 252/589 |

FOREIGN PATENT DOCUMENTS

| EP | 0 317 263 | 5/1989 |
| JP | 61-138648 | 6/1986 |
| JP | 5-242552 | 9/1993 |
| WO | 99/41307 | 8/1999 |

OTHER PUBLICATIONS

**Patents Abstracts of Japan, vol. 014, No. 077 (C–0688), Feb. 14, 1990 & JP 01 294753 A (Mitsubishi Kasei Corp.), Nov. 28, 1989.
**Chemical Abstracts, vol. 126, No. 23, Jun. 9, 1997, Columbus, Ohio, US; abstract No. 306116.
M. Clauss: "Stabilization of styrenic based compounds in presence of benzofuranone derivatives" XP002141031 & Res. Discl. Bd. 396(Apr.), Nr. 39656, 1997, Seiten 270–272.
**Chemical Abstracts, vol. 72, No. 18, May 4, 1970, Columbus, Ohio, US; abstract No. 91087.
E.F. Zinin: "Increased stability of poly(vinylcyclohexane)O during processing" XP002141032 & Plast. Massy, Bd. 1, 1970, Seiten 32–34.

* cited by examiner

*Primary Examiner*—Peter D. Mulcahy
(74) *Attorney, Agent, or Firm*—Joseph C. Gil; Aron Preis

(57) ABSTRACT

A thermoplastic molding composition containing a (co)polymer of vinylcyclohexane and a stabilizer system is disclosed. The stabilizer system contains lactone, sterically hindered phenol and a phosphite compound. The composition that is characterized by its improved thermal stability is suitable for the preparation of molded articles, including optical data carriers.

15 Claims, No Drawings

VINYLCYCLOHEXANE— BASED POLYMER/COPOLYMER MIXTURE AND STABILIZER SYSTEM

The present invention relates to a mixture containing vinylcyclohexane (VCH)-based polymer/copolymer and a stabiliser system, containing lactone, sterically hindered phenol and phosphite component, and to a process for the preparation of said mixture and to the use of the mixture for the manufacture of moulded articles.

In comparison with polycarbonate currently used for the manufacture of optical data stores, homopolymers with sufficient mechanical properties of the vinylcyclohexane-based polymer exhibit a higher viscosity at the same temperature in a wide range of low shear rates.

The lowest possible viscosity is of considerable importance for sufficiently good pit and groove reproduction in injection moulding.

For high densities of data storage of >5 Gbytes, particularly >10 Gbytes, accurate reproduction of the smaller and more closely packed pits and the grooves that are possible nowadays is essential. The optical storage media described in EP-A 317 263 and U.S. Pat. No. 4 911 966 are not satisfactory for this use.

In order to obtain the largest possible processing window, high processing temperatures generally above 300° C. are required for the homopolymer without a significant decrease in molecular weight occurring.

Generally speaking, a decrease in molecular weight leads to a deterioration in the mechanical properties of polymers. A sufficient level of mechanical properties is, however, necessary for the reliable manufacture of optical discs in injection moulding and for the subsequent manipulation thereof.

In everyday use the material must also be resistant to flexure and fracture.

During machine downtimes in processing it is important to ensure that the material does not suffer a drastic loss of molecular weight during this period.

The phenol and phosphorus stabilisers described in JP 01-294 753, JP 5-242 522 are suitable in high concentrations for limiting the decrease in molecular weight but lead to a considerable decrease in molecular weight at processing temperatures of only about 300° C.

JP 61-138648 describes optical data carriers which are manufactured from, i.a. polymethylmethacrylate, polycarbonate and polystyrene, the polymers containing 2-benzofuranones as stabiliser.

The object now is to stabilise VCH-based polymers/copolymers in such a way that processing can take place without a significant decrease in molecular weight, even at high temperatures.

The mixtures according to the invention do not exhibit a significant decrease in the molecular weight of the polymer, even at elevated temperatures.

Surprisingly, it was found that a stabiliser system containing lactone, sterically hindered phenol, and a phosphite component together with vinylcyclohexane-based polymers markedly improves the thermostabilisation for injection-moulded optical data carriers at processing temperatures of >300° C., preferably >320° C., particularly preferably >330° C. and that no significant decrease in molecular weight occurs. Depending on the polymer, degradation processes start to a large extent at temperatures between 350 and 380° C. Conventional injection moulding machines permit processing up to about 400° C.

The invention relates to a mixture containing A) vinylcyclohexane-based polymer and B) stabiliser system containing lactone, sterically hindered phenol and a phosphite compound.

Component A

The preferred vinylcyclohexane-based polymer comprises a recurring structural unit of the formula (I)

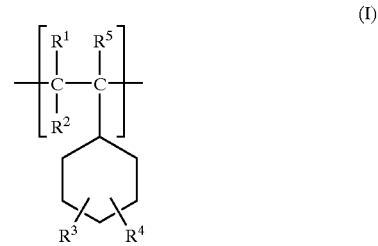

wherein $R^1$ and $R^2$, independently of each other, represent hydrogen or $C_1$–$C_6$-alkyl, preferably $C_1$–$C_4$-alkyl, and $R^3$ and $R^4$, independently of each other, represent hydrogen or for $C_1$–$C_6$-alkyl, preferably $C_1$–$C_4$-alkyl, particularly methyl and/or ethyl, or $R^3$ and $R^4$ jointly represent alkylene, preferably $C_3$ or $C_4$-alkylene, partially condensed 5 or 6-membered cycloaliphatic ring, $R^5$ represents hydrogen or $C_1$–$C_6$-alkyl, preferably $C_1$–$C_4$-alkyl, $R^1$, $R^2$ and $R^3$, independently of each another, represent in particular hydrogen or methyl.

The bonding may, apart from the stereoregular head-to-tail bonds, have a small proportion of head-to-head bonds.

The VCH preferably have a predominantly isotactic or syndiotactic diad configuration, more particularly, polymers with a proportion of 50.1 to 74% syndiotactic diads are preferred, more particularly preferably 52 to 70%.

Comonomers which may be used in preference during the polymerisation of the starting polymers (optionally substituted polystyrene) and incorporated in the polymer include: olefins generally having 2 to 10 C atoms such as, for example, ethylene, propylene, isoprene, isobutylene, butadiene, $C_1$–$C_8$ preferably $C_1$–$C_4$-alkyl esters of acrylic and methacrylic acid, unsaturated cycloaliphatic hydrocarbons, e.g., cyclopentadiene, cyclohexene, cyclohexadiene, optionally substituted norbornene, dicyclopentadiene, dihydrocyclopentadiene, optionally substituted tetracyclododecenes, styrenes alkylated on the nucleus, a-methylstyrene, divinylbenzene, vinyl esters, vinyl acids, vinyl ethers, vinyl acetate, vinyl cyanides such as, for example, acrylonitrile, methacrylonitrile, maleic anhydride and mixtures of said monomers. In general, up to 60 wt. % of comonomers based on the polymer may be contained in the polymer, preferably up to 50 wt. %, particularly up to 40 wt. %, most particularly preferably the polymers 1 may contain up to 30 wt. % of comonomers.

The vinylcyclohexane (co)polymers generally have absolute molecular weights Mw (weight-average) of 1000–10000000, preferably 60000–1000000, more particularly preferably 70000–600000, determined by light scattering.

The copolymers may be present both as random copolymers and as block copolymers.

The polymers may have a linear chain structure and have branching sites due to co-units (e.g. graft copolymers). The branching centres include, e.g. star-shaped or branched polymers. The polymers according to the invention may have other geometric shapes of the primary, secondary, tertiary, optionally quaternary polymer structure. Examples include helix, double helix, folded sheet etc. or mixtures of said structures.

Block copolymers include di-blocks, tri-blocks, multi-blocks and star-shaped block copolymers.

Component B

The stabiliser system contains lactone corresponding to formula (I), sterically hindered phenol corresponding to formula (II) and phosphite component corresponding to formula (III), wherein one or more compounds corresponding to formulae (I), (II) and (Il) may be used.

Lactones are preferably compounds corresponding to formula (I)

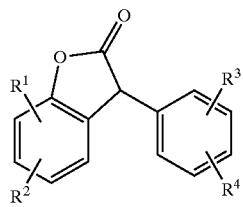
(I)

wherein $R^1$, $R^2$, $R^3$ and $R^4$, independently of each other, represent hydrogen or $C_1$–$C_6$-alkyl, preferably $C_1$–$C_4$-alkyl, optionally a 5 or 6-membered ring, preferably cyclohexyl or cyclopentyl. $R^1$ and $R^2$, independently of each other, particularly preferably represent for branched $C_3$–$C_4$-alkyl, particularly iso-propyl and/or tert-butyl.

A particularly preferred lactone is 5,7-di-t-butyl-3-(3,4-dimethylphenyl)-3H-benzofuran-2-one. Sterically hindered phenols are preferably compounds corresponding to formula (II)

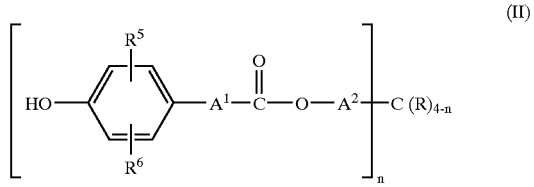
(II)

wherein $R^5$ and $R^6$, independently of each other, represent hydrogen or $C_1$–$C_6$alkyl, preferably $C_1$–$C_4$-alkyl, optionally a 5 or 6-membered ring, preferably cyclohexyl or cyclopentyl, $R^5$ and $R^6$, independently of each other, represent particularly preferably $C_3$–$C_4$-alkyl, particularly for iso-propyl and/or tert-butyl, n represents an integer from 1 to 4, preferably for 3 or 4, particularly 4, $A^1$ and $A^2$, independently of each other, represent $C_1$–$C_6$-alkylene, preferably $C_1$–$C_4$-alkylene, particularly methylene, ethylene, R, independently, represents hydrogen, $C_1$–$C_6$-alkyl, preferably $C_1$–$C_4$-alkyl, $C_1$–$C_6$-alkoxy, preferably $C_1$–$C_4$-alkoxy, optionally a 5 or 6-membered ring, preferably cyclohexyl or cyclopentyl.

Phosphite components are preferably compounds corresponding to formula (III):

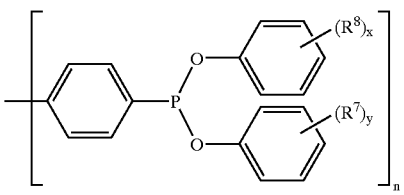
(III)

wherein $R^7$ and $R^8$, independently of each other, represent hydrogen or $C_1$–$C_6$-alkyl, preferably $C_1$–$C_4$-alkyl, optionally a 5 or 6-membered ring, preferably cyclohexyl or cyclopentyl, x and y, independently of each other, represent 0, 1, 2, 3, 4, 5, preferably 0, 1 or 2 and n represents 1 or 2, $R^7$ and $R^8$, independently of each other, stand particularly preferably represent $C_3$–$C_4$alkyl, particularly iso-propyl and/or tert-butyl.

If n =1, the valence bond of the carbon atom in question is attached to hydrogen or $C_1$–$C_6$-alkyl, $C_1$–$C_6$-alkoxy, optionally 5 or 6-membered ring, preferably $C_1$–$C_4$-alkyl, preferably to the radicals named in the case of $R^7$ and $R_8$.

The structural formulae given reproduce in each case the main components (>90%) of the industrially used compounds which may contain e.g. isomers, starting compounds and secondary compounds in smaller proportions.

The stabiliser mixture containing a lactone derivative I, sterically hindered phenol II and phosphite component III (phosphonite) is generally used in proportions by weight, based on the polymer used, of 2% to 0.001%, preferably 1% to 0.005%, and more particularly preferably 0.6% to 0.01%.

The proportion of individual components of lactone I, sterically hindered phenol II and phosphite component III (phosphonite) is generally 5 to 95 parts by wt., preferably 10 to 60 parts by wt., the proportions of the individual components adding up to 100.

A mixture more particularly preferred contains the lactone HP 136 (compound I-1) (Ciba Speciality Chemicals, Basel, Switzerland) with a proportion of 5 to 40, particularly 10 to 25 parts by wt., the sterically hindered phenol Irganox 1010 (compound II-1) (Ciba Speciality Chemicals, Basel, Switzerland) with a proportion of 30 to 70 parts by wt., and the phosphonite Irgafos P-EPQ (compound III-1) (Ciba Speciality Chemicals, Basel, Switzerland), with a proportion of 10 to 50 parts by wt., the proportions of the individual components adding up to 100.

The formulae of the compounds I-1, II-1 and III-1 are shown below:

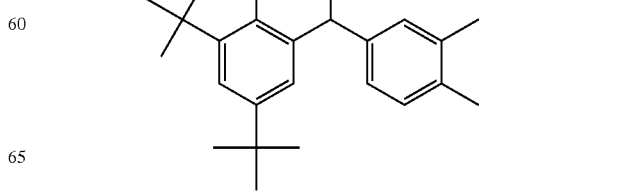
(I-1)

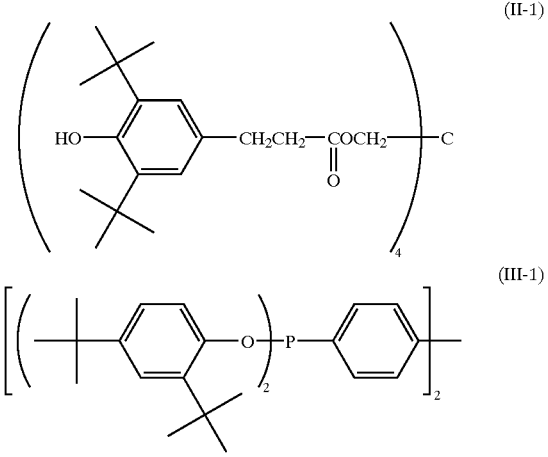

The lactones, sterically hindered phenols and phosphite compounds are generally well known and available commercially.

The VCH (co)polymers are prepared by polymerising derivatives of styrene with the corresponding monomers by free-radical, anionic or cationic polymerisation or by means of metal complex initiators or catalysts, and the unsaturated aromatic bonds are then hydrogenated wholly or partially (cf. e.g. WO 94/21694, EP-A 322 731).

The vinylcyclohexane-based polymers generally exhibit practically complete hydrogenation of the aromatic units. As a rule, the degree of hydrogenation is $\geq 80\%$, preferably $\geq 90\%$, more particularly preferably $\geq 99\%$ to 100%. The degree of hydrogenation can be determined, for example, by NMR or UV spectroscopy.

The starting polymers are generally well known (e.g. WO 94/21694).

The amount of catalyst used depends on the process carried out; this may be carried out continuously, semi-continuously, or batchwise.

The ratio of catalyst to polymer is, for example, generally 0.3–0.001, preferably 0.2–0.005, particularly preferably 0.15–0.01 in the batchwise process.

The polymer concentrations, based on the total weight of solvent and polymer, are generally 80 to 1, preferably 50 to 10, particularly 40 to 15 wt. %.

Hydrogenation of the starting polymers is carried out according to generally well known methods (e.g. WO 94/21 694, WO 96/34 895, EP-A-322 731). A plurality of well known hydrogenation catalysts may be used as catalysts. Preferred metal catalysts are mentioned, for example, in WO 94/21 694 or WO 96/34 896. The catalyst used may be any catalyst known for hydrogenation reactions. Catalysts with a large surface area (e.g. 100–600 m$^2$/g) and a small average pore diameter (e.g. 20–500 Å) are suitable. Also suitable are catalysts with a small surface area (e.g. $\geq$10 m$^2$/g) and large average pore diameters which are characterised in that 98% of the pore volume have pores with pore diameters greater than 600 Å(e.g. about 1000–4000 Å) (cf. e.g. U.S. Pat. No. 5.654.253, U.S. Pat. No. 5.612.422, JP-A 03076706). More particularly, Raney nickel, nickel on silica or silica/alumina, nickel on carbon as support and/or noble metal catalysts e.g. Pt, Ru, Rh, Pd are used.

The reaction is generally carried out at temperatures between 0 and 380° C., preferably between 20 and 250° C., particularly between 60 and 200° C.

The conventional solvents which may be used for hydrogenation reactions are described, for example, in DE-AS 1 131 885 (see above).

The reaction is generally carried out at pressures from 1 to 1000 bar, preferably 20 to 300 bar, particularly 40 to 200 bar.

The stabiliser may be introduced at any moment in the preparation process of the vinylcyclohexane-based polymer before or after a process stage in solution, in the solid, liquid or gaseous aggregate stage. The process stages include, optionally, polymerisation which leads to a prepolymer, e.g. polystyrene derivative, optionally hydrogenation of the prepolymer, optionally an evaporation stage, and optionally extrusion or compounding of the vinylcyclohexane-based polymer.

The stabilised vinylcyclohexane-based polymers or copolymers according to the invention are outstandingly suitable for the manufacture of moulded articles and films. These are also particularly suitable for the manufacture of optical data stores, preferably with data storage densities of >5, particularly >10 gigabytes, based on a disc with a diameter of 120 mm.

The mixtures according to the invention may contain at least one of the conventional additives such as lubricants and mould release agents, nucleating agents, antistatic agents, stabilisers and dyes and pigments.

The mixtures according to the invention are prepared by mixing the vinylcyclohexane-based polymers or copolymers with the stabiliser system and optionally further additives and compounding at elevated temperatures (generally >230° C.).

Examples of optical data stores include:
magneto-optical disc (MO disc)
mini-disc (MD)
ASMO (MO-7) ("Advanced storage magnetooptic")
DVR (12 Gbyte disc)
MAMMOS ("Magnetic Amplifying magneto optical system")
SIL and MSR ("Solid immersion lens" and "magnetic superresolution")
CD-ROM (Read only memory)
CD, CD-R (recordable), CD-RW (rewritable), CD-I (interactive), Photo-CD
Super Audio CD
DVD, DVD-R (recordable), DVD-RAM (random access memory);
DVD=Digital versatile disc
DVD-RW (rewritable)
PC+RW (Phase change and rewritable)
MMVF (multimedia video file system)

The polymers according to the invention, because of their outstanding optical properties, are also particularly suitable for the manufacture of optical materials, e.g. for lenses, prisms, mirrors, colour filters etc., also as media for holographic images (e.g. cheque cards, credit cards, identification cards, three-dimensional holographic images). The materials may be used as transparent media for inscribing three-dimensional structures e.g. from focused coherent radiation (LASER), particularly as three-dimensional data stores or for three-dimensional reproduction of articles. In view of the low birefringence, the polymers according to the invention are particularly suitable matrix material for photo-addressable polymers. The addition of the stabiliser leads not only to the general effect of themostabilisation but also to better demouldability from the injection mould.

EXAMPLES

Preparation of Examples 1–3

A 40 l autoclave is flushed with inert gas (nitrogen). The polymer solution and the catalyst are added (Table 1). After the autoclave has been closed it is pressurised several times with protective gas and then with hydrogen. After the pressure has been released the relevant hydrogen pressure is adjusted and the contents heated, with stirring, to the appropriate reaction temperature. The reaction pressure is kept constant after the hydrogen uptake has commenced.

After the reaction has ended the polymer solution is filtered. The stabiliser is added, solvent is removed from the product at 240° C. and the product is processed further as a granular material (Example 2 and 3, Table 2).

TABLE 1

Hydrogenation of polystyrene for the preparation of vinylcyclohexane-based polymers

| Ex. no. | Polymer mass[2] kg | Solvent l | Catalyst mass[3] g | Reaction temp. ° C. | Hydrogen pressure bar | Reaction time h | Degree of hydrogenation[1] % |
|---|---|---|---|---|---|---|---|
| 1 | 5.0 | 25 cyclohexane | 625[3] | 180 | 100 | 24.5 | 100 |
| 2 | 5.7 | 15 cyclohexane 10 methyl-t-butyl ether | 625 | 140 | 100 | 29.5 | 100 |
| 3 | 4.8 | 15.1 cyclohexane 10.1 methyl-t-butyl ether | 625 | 160 | 100 | 27 | 100 |

[1] Determined by $^1$H-NMR spectroscopy
[2] Polystyrene, type 158 k transparent, $\overline{M}w$ = 280000 g/mol, absolute $\overline{M}w$ (weight-average), BASF AG, Ludwigshafen, Germany
[3] Ni/SiO$_2$/Al$_2$O$_3$, Ni 5136 P, Engelhard, De Meern, Netherlands The relative molecular weights of the hydrogenated polystyrene are, (measured by GPC in tetrahydrofuran, against polystyrene standard)

Example 1 (comparison): 106 000 g/mole

Example 2 (comparison): 161 000 g/mole

Example 3 (according to the invention): 167 000 g/mole

The amount of stabiliser and the relative molecular weights of the vinylcyclohexane-based polymers after extrusion are given in Table 2.

TABLE 2

Extrusion of vinylcyclohexane-based polymers

| Example | | Max. processing temp. ° C. | Molecular weights[1] Mw 10$^3$ mol$^{-1}$ | Amount of stabiliser[3] % | Sterically hindered phenol[4] % | Phosphite phosphonite[4] % | Lactone[4] % |
|---|---|---|---|---|---|---|---|
| 1 Comparison | Extrusion | 240 | 67 | — | — | — | — |
| 2 Comparison | Extrusion[2] | 315 | 142 | 0.46 | 25 (Irganox 1010) | 75 (Irgafos 168) | — |
| 3 acc. to the invention | Extrusion[2] | 335 | 160 | 0.40 | 50 (Irganox 1010) | 33 (Irgafos P-EPQ) | 17 (HP136) |

[1] determined as relative molecular weights Mw against THF-GC polystyrene standard
[2] CD injection moulding machine, Netstal Diskjet 600
[3] based on the starting polymer
[4] based on the stabilizer system Comparison example 1 shows that without the addition of a stabiliser, a drastic decrease in molecular weight ($\overline{M}w$) takes place at a processing temperature of only 240° C. The stabiliser system, which is composed only of a sterically hindered phenol and a phosphorus compound, has the disadvantage that a significant decrease in molecular weight takes place at the high temperatures (>300° C.) required for the injection moulding of optical high density storage media (comparison example 2). The stabiliser system according to the invention exhibits no significant decrease in the molecular weight of the polymer at a much higher processing temperature (335° C.) and is, therefore, particularly suitable as a stabiliser of vinylcyclohexane-based polymers for the manufacture of optical data storage media at high processing temperatures.

What is claimed is:

1. A method of using a thermoplastic molding composition that contains (A) a (co)polymer of vinylcyclohexane and (B) a stabilizer system that includes lactone, sterically hindered phenol and phosphite compound comprising manufacturing an article by injection molding at temperatures higher than 300° c.

2. The method of claim 1 wherein article is a film.

3. The method of claim 1 wherein article is an optical data carrier.

4. The molded article manufactured by the method of claim 1.

5. The optical data carrier manufactured by the method of claim 3.

6. The method of claim 1 wherein the composition contains 0.001 to 2% of said stabilizer system, the percent being relative to the weight of the composition.

7. The method of claim 1 wherein the composition contains 0.005 to 1% of said stabilizer system, the percent being relative to the weight of the composition.

8. The method of claim 1 wherein the lactone corresponds to formula (I)

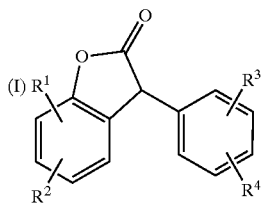 (I)

wherein
$R^1$, $R^2$, $R^3$ and $R^4$, independently of each other, represent hydrogen, $C_1$–$C_6$-alkyl, or a 5 or 6-membered ring alkyl,
and where the sterically hindered phenol corresponds to formula (II)

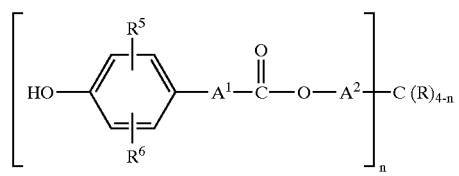 (II)

wherein
$R^5$ and $R^6$, independently of each other, represent hydrogen or $C_1$–$C_6$-alkyl, a 5 or 6-membered ring,
n represents an integer from 1 to 4, and
R, independently, represents hydrogen, $C_1$–$C_6$-alkyl, $C_1$–$C_6$-alkoxy, a 5 or 6-membered ring,
and where the phosphite component corresponding to formula (Ill)

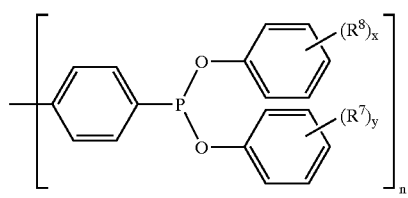 (III)

wherein
$R^7$ and $R^8$, independently of each other, represents hydrogen, $C_1$–$C_6$-alkyl, also as a 5 or 6-membered ring or as branched alkyl, and x and y, independently of each other, represent 0, 1, 2, 3, 4, 5, and n represents 1 or 2, wherein if n=1 the free valence bond of the carbon atom is attached to hydrogen, $C_1$–$C_6$-alkyl, $C_{1-6}$-alkoxy or to 5,6 rings.

9. The method of claim 8 wherein the lactone is present in an amount of 5 to 95 parts, the hindered phenol is present in an amount of 5 to 95 parts and phosphite is present in an amount of 5 to 95 parts, the parts based on the weight of the stabilizer system.

10. The method of claim 8 wherein the lactone is present in an amount of 5 to 60 parts, the hindered phenol is present in an amount of 10 to 60 parts and phosphite is present in an amount of 10 to 60 parts, the parts based on the weight of the stabilizer system.

11. The method of claim 1 wherein the (co)polymer of vinylcyclohexane contains at least one structural unit conforming to the formula

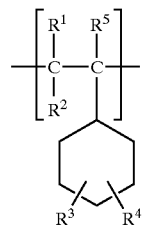 (I)

wherein
$R^3$ and $R^4$, independently of each other, represent hydrogen or $C_1$–$C_6$-alkyl or $R^3$ and $R^4$ together represent alkylene,
$R^1$, $R^2$ and $R^5$, independently of each other, represent hydrogen or $C_1$–$C_6$-alkyl.

12. The method of claim 1 wherein the stabilizer system contains

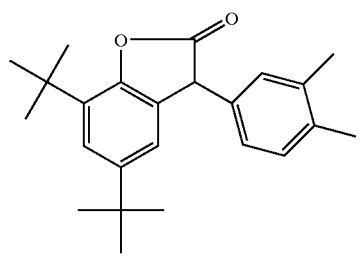 (I-1)

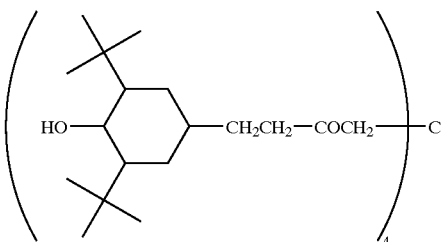 (II-1)

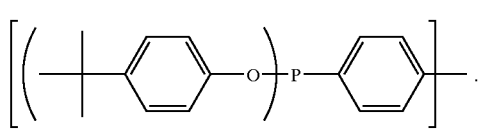 (III-1)

13. The method of claim 1 wherein A is a copolymer of at least one monomer selected from the group consisting of olefin, alkyl ester of acrylic acid, alkyl ester of methacrylic acid, unsaturated cycloaliphatic hydrocarbon, styrene, alpha methyl styrene and styrene substituted in the nucleus, divinyl benzene, vinyl ester, vinyl acid, vinyl ether, vinyl acetate, vinyl cyanide and maleic anhydride.

14. The method of claim 1 wherein the (co)polymer of vinylcyclohexane has a predominantly syndiotactic diad configuration.

15. The method of claim 1 wherein the thermoplastic molding composition further contains at least one member selected from the group consisting of processing aid, nucleating agent, mould release agent, dye, pigment, stabilizer and antistatic agent.

* * * * *